(12) United States Patent
Choi et al.

(10) Patent No.: US 8,784,765 B2
(45) Date of Patent: Jul. 22, 2014

(54) $C_{70}$ CUBE WITH ENHANCED PHOTOLUMINESCENCE AND METHOD FOR PREPARING THE SAME

(75) Inventors: Hee Cheul Choi, Gyeongsangbuk-do (KR); Chi Beom Park, Gyeongsangbuk-do (KR)

(73) Assignee: Postech Academy-Industry Foundation, Pohang (KR)

( * ) Notice: Subject to any disclaimer, the term of this patent is extended or adjusted under 35 U.S.C. 154(b) by 324 days.

(21) Appl. No.: 13/284,388

(22) Filed: Oct. 28, 2011

(65) Prior Publication Data

US 2012/0205587 A1    Aug. 16, 2012

(30) Foreign Application Priority Data

Feb. 14, 2011   (KR) .................. 10-2011-0012862

(51) Int. Cl.
*B82B 1/00*       (2006.01)
*B82Y 30/00*      (2011.01)
*B82Y 20/00*      (2011.01)

(52) U.S. Cl.
CPC .............. *B82Y 30/00* (2013.01); *B82Y 20/00* (2013.01); *Y10S 977/735* (2013.01)
USPC ...................................... 423/445 B; 977/735

(58) Field of Classification Search
USPC ...................................... 423/445 B; 977/735
See application file for complete search history.

(56) References Cited

PUBLICATIONS

Hebard, 'Deposition and Characterization of Fullerene Films' in Applied Physics Letters vol. 59 #17 pp. 2109-2111 1991.*
Chuang et al., "Systematics of High-Genus Fullerenes," *J. Chem. Inf. Model.*, 49:1664-1668 (2009).
Yao et al., "Synthesis and Growth Mechanism of Differently Shaped $C_{60}$ Nano/Microcrystals Produced by Evaporation of Various Aromatic $C_{60}$ Solutions," *Carbon* 47:1181-1188 (2009).
Park, "Self-crystallization of $C_{70}$ cubes and remarkable enhacement of photoluminescence," published online: Nov. 9, 2010 (DOI:10.1002/anie.201005076).

* cited by examiner

*Primary Examiner* — Stuart Hendrickson
(74) *Attorney, Agent, or Firm* — Marshall, Gerstein & Borun LLP

(57) ABSTRACT

Disclosed in that a fullerene aggregate and a method for preparing the same, and the fullerene aggregate including a cube-shaped crystalline $C_{70}$ non-solvent aggregate.

24 Claims, 11 Drawing Sheets

$C_{70}$ CUBE WITH ENHANCED PHOTOLUMINESCENCE AND METHOD FOR PREPARING THE SAME

BACKGROUND OF THE INVENTION (a) Field of the Invention

This disclosure relates to a method of preparing a fullerene aggregate and the aggregate. More specifically, this disclosure relates to a method of preparing a $C_{70}$ aggregate that is aggregated to a well-defined shape, and optical properties of the $C_{70}$ aggregate.

(b) Description of the Related Art

Preparation of a light emission source that emits light from an organic molecule or organic molecular system is important in the large-scale production of electronic equipment and photoelectronic equipment of the next generation with low cost. Further, it is expected that use of the organic light emission source may contribute to light weight and flexibility of the compositional material of the next generation electronic equipment or photoelectronic equipment. Light emission occurring by recombination of excitons requires a specific energy bandgap, and it is known that in order for the organic light emission source to satisfy the condition, an organic molecule with a high degree of conjugated double bonds should exist as a crystal structure Fullerene including $C_{70}$ and $C_{60}$ (Buckminster fullerene) and are a carbon allotrope, the whole molecule consists of conjugated double bonds, and it has a specific energy bandgap that may be easily controlled by doping, and thus has received a lot of attention. Further, since fullerene may have semiconductivity and superconductivity, it is a promising future electronic equipment material. Meanwhile, fullerene has a drawback that the photoluminescence characteristic is not excellent, contrary to the excellent electrical characteristic, and thus it has a limitation for use as a light emission source.

Recently, it has been reported that if $C_{60}$ exists as a specific ensemble in a powder phase or a solution phase, the fluorescent characteristic may be improved, and $C_{60}$ has received attention. Although a lot of studies have progressed on $C_{60}$, studies on $C_{70}$ are relatively insufficient.

SUMMARY OF THE INVENTION

An exemplary embodiment of the invention provides a fullerene aggregate including a $C_{70}$ aggregate of a novel shape. Another embodiment of the invention provides a $C_{70}$ aggregate with improved photoluminescence characteristic.

According to one aspect of the invention, a fullerene aggregate including a cube-shaped crystalline $C_{70}$ non-solvent aggregate is provided. According to one embodiment, the cube-shaped crystalline $C_{70}$ non-solvent aggregate includes $C_{70}$ molecules form a cubic crystal structure, for example, a face centered cubic crystal structure.

According to another aspect of the invention, a fullerene aggregate including a cube-shaped crystalline $C_{70}$·2mesitylene aggregate is provided. According to one embodiment, the $C_{70}$·2mesitylene aggregate includes $C_{70}$ molecules form a cubic crystal structure, for example, a simple cubic crystal structure.

According to the specific embodiments of the cube-shaped crystalline $C_{70}$ non-solvent aggregate or the cube-shaped crystalline $C_{70}$·2mesitylene aggregate, the length of the longest side of the cube is about 0.1 μm to about 100 μm.

According to yet another embodiment of the invention, a method of preparing a $C_{70}$ aggregate is provided that includes: (a) adding a poor solvent selected from isopropanol, methanol, ethanol, acetone, propanol, butanol, acetonitrile, and hexane, or a mixed solvent thereof, to a mesitylene solution of $C_{70}$ to prepare a mixed dispersion, wherein the poor solvent is slowly added below or equal to a rate where an interface distinguishing a mesitylene layer and a poor solvent layer is maintained in the mixed dispersion; and (b) allowing the mixed dispersion to stand so that a $C_{70}$ aggregate may be precipitated.

According to yet another aspect of the invention, a method of preparing a $C_{70}$ aggregate is provided that includes: (a) adding a poor solvent selected from isopropanol, methanol, ethanol, acetone, propanol, butanol, acetonitrile, and hexane, or a mixed solvent thereof, to a mesitylene solution of $C_{70}$ to prepare a mixed dispersion, wherein the mixed solution is sonicated simultaneously with or immediately after adding the poor solvent; and (b) allowing the mixed dispersion to stand so that a $C_{70}$ aggregate may be precipitated.

According to yet another embodiment of the invention, a method of preparing a $C_{70}$ non-solvent aggregate is provided that includes: (a) preparing a cube-shaped crystalline $C_{70}$ aggregate including a $C_{70}$·2mesitylene aggregate; and (b) treating the $C_{70}$ aggregate by thermal annealing under a reducing or inert atmosphere.

The $C_{70}$ aggregate has high crystallinity and is a novel cube-shaped aggregate. According to the $C_{70}$ aggregate preparing method of the invention, the size and shape of a $C_{70}$ cube may be easily controlled by controlling the relative ratio of mesitylene and a poor solvent to $C_{70}$, or according to the method of dispersing a $C_{70}$ raw material in the mixed solvent. Since the $C_{70}$ cube aggregate of the invention has a remarkably improved photoluminescence characteristic compared to $C_{70}$ powder, it is expected to contribute to cost reduction and large scale of the next generation device if it is used as an organic light emitting component of the next generation electron and photoelectronic devices. Further, the $C_{70}$ cube aggregate of the invention may contribute to the light weight and flexibility of the next generation electron and photoelectronic devices.

DETAILED DESCRIPTION OF THE INVENTION

Figure 1:
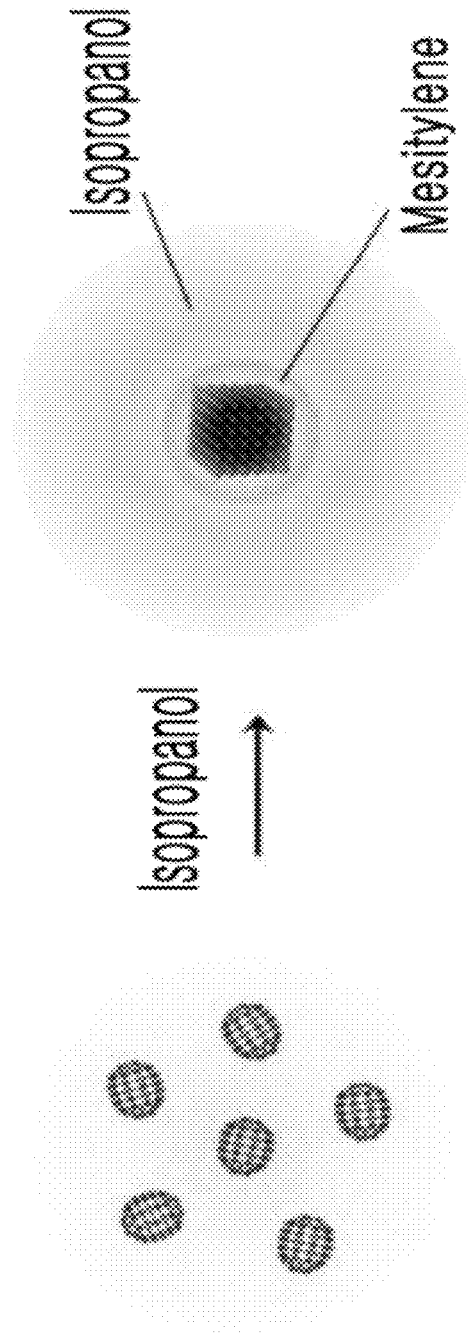
FIG. 1 is a schematic view showing one possible process where $C_{70}$ forms a cube-shaped aggregate in a mixed solvent of mesitylene and isopropanol.

Hereinafter, the present invention is described in detail.

Definition of Terminologies

As used herein, "a $C_{70}$ aggregate" refers to a state wherein a plurality of $C_{70}$ fullerene molecules are aggregated by a force between molecules including Van der Waals force and the like, and the size may be several nanometers to several microns. As used herein, the $C_{70}$ aggregate may be an aggregate consisting only of pure $C_{70}$ fullerene molecules, it may be a solvate further including a solvent in addition to $C_{70}$, or it may further include other molecules at a specific ratio. Thus, the specific meaning of the $C_{70}$ aggregate is determined according to the context. When a clear distinction is required, a pure $C_{70}$ aggregate that does not include a solvent is referred to as a "$C_{70}$ non-solvent aggregate" herein. Likewise, in the case of a solvate of $C_{70}$ where the $C_{70}$ aggregate includes a solvent at a specific ratio, the composition of the solvate may be specified for distinction, and for example, it may be indicated by "$C_{70}$.2mesitylene aggregate".

As used herein, the $C_{70}$ aggregate may be represented by "cube-shaped", "cubic" or "cube", or "$C_{70}$ aggregate cube" and "$C_{70}$ cube", which may be interchangeably used, and indicates that the shape the of $C_{70}$ aggregate is observed as a cube (hexahedron or rectangular parallelepiped) crystal with an electron microscope. In the sense that it is observed as a cube shape having 6 well-defined sides, it may be represented by a "cube-shaped crystalline $C_{70}$ aggregate" herein.

As used herein, the "$C_{70}$ aggregate" may include a $C_{70}$ aggregate of another shape in addition to the "cube-shaped (crystalline) $C_{70}$ aggregate including a cubic crystal structure".

One aspect of the invention provides a fullerene aggregate including a cube-shaped crystalline $C_{70}$ non-solvent aggregate. The cube-shaped crystalline $C_{70}$ non-solvent aggregate may have a cubic crystal structure, and for example, face centered cubic crystal structure. The cube-shaped crystalline $C_{70}$ non-solvent aggregate has 6 clear sides and has a hexahedral or rectangular parallelepiped shape when observed with an electron microscope.

According to one embodiment of the non-solvent aggregate, the cube-shaped aggregate has an average particle size of about 0.1 μm to about 100 μm. As used herein, the average particle size refers to an average value of the lengths of the longest sides of aggregate particles.

According to one embodiment of the cube-shaped aggregate, the $C_{70}$ non-solvent aggregate is prepared by thermal annealing of a cube-shaped crystalline $C_{70}$.2mesitylene aggregate under a reducing or inert atmosphere.

According to one embodiment of the cube-shaped aggregate, the $C_{70}$ non-solvent aggregate includes $C_{70}$ molecules forming a cubic crystal structure, i.e., has a cubic crystal structure. According to more specific embodiment, the cube-shaped crystalline $C_{70}$ non-solvent aggregate has a face centered cubic crystal structure.

Since the cube-shaped crystalline $C_{70}$ non-solvent aggregate has high crystallinity with $C_{70}$ molecules being arranged with high regularity, it has a largely improved photoluminescence characteristic compared to common $C_{70}$ powder that does not have crystallinity.

Another aspect of the invention provides a fullerene aggregate including a cube-shaped crystalline $C_{70}$.2mesitylene ($C_{70}$.$2C_9H_{12}$) aggregate. The chemical composition of the cube-shaped crystalline $C_{70}$.2mesitylene aggregate includes one $C_{70}$ molecule and two mesitylene ($C_9H_{12}$) molecules. The cube-shaped crystalline $C_{70}$.2mesitylene has 6 clear sides and has a hexahedral or rectangular parallelepiped shape when observed with an electron microscope. According to one embodiment of the $C_{70}$ aggregate, the cube-shaped aggregate has an average particle size of about 0.1 μm to about 100 μm.

According to one embodiment of the cube-shaped aggregate, in the cube-shaped crystalline $C_{70}$.2mesitylene aggregate, $C_{70}$ molecules form a simple cubic crystal structure. According to a more specific embodiment, in the cube-shaped crystalline $C_{70}$ non-solvent aggregate, $C_{70}$ molecules form a face centered cubic crystal structure. According to a still embodiment, the cubic crystal has a lattice constant of about 10.4 Å to 10.6 Å at a temperature of about 90K to about 300K. According to a still more specific embodiment, the cubic crystal has a lattice constant of about 10.48 Å at a temperature of about 90K or a temperature of about 10.59 Å at about 300K.

According to the above specific embodiment, a unit cell of the crystal includes one $C_{70}$ molecule in the center and mesitylene that is partially located at 8 corners of the unit cell, thus a total of 2 mesitylene molecules in one unit cell. Yet another aspect of the invention provides a method of preparing a cube-shaped crystalline $C_{70}$ aggregate using a mixed solvent of mesitylene that is a good solvent to $C_{70}$ and a poor solvent.

Without being bound by a specific theory regarding the production of a cube-shaped crystalline $C_{70}$ aggregate, it is believed that if a poor solvent to $C_{70}$ is added to mesitylene of $C_{70}$, that is a good solvent to $C_{70}$, a cavity of the mesitylene solvent including $C_{70}$ molecules is produced in the poor solvent. One possible way to achieve this is schematically shown in FIG. 1.

FIG. 1 shows that after one of a poor solvent, isopropanol, is added to a mesitylene solution of $C_{70}$, a mesitylene cavity surrounded by isopropanol in a continuous phase is generated by active agitation or passive diffusion, and the like, and $C_{70}$ molecules in the mesitylene cavity are aggregated to produce a cube-shaped crystal. It is believed that if the mesitylene cavity is formed by the addition of the poor solvent, spontaneous crystallization of $C_{70}$ molecules that are locally gathered in the cavity is induced. The principle shown in FIG. 1 is an illustrative explanation for understanding of a cube-shaped crystalline $C_{70}$ aggregate, and the cube-shaped crystalline $C_{70}$ aggregate may be easily prepared by one of ordinary knowledge in the art referring to the following preparation method, irrespective of FIG. 1 and the above explanations.

One method of preparing a cube-shaped crystalline $C_{70}$ aggregate is aggregation of a mixed solvent of a mesitylene-poor solvent, wherein the addition of the poor solvent slowly occurs.

The preparation method includes:

(a) adding a poor solvent to a mesitylene solution of $C_{70}$ to prepare a mixed dispersion, wherein the poor solvent is slowly added below or equal to a rate where an interface distinguishing a mesitylene layer and a poor solvent layer is maintained in the mixed dispersion; and (b) allowing the mixed dispersion to stand so that a $C_{70}$ aggregate may be precipitated.

In the preparation method, the addition of the poor solvent in the step (a) may include slowly adding the poor solvent along the wall of a container including the mesitylene solution of $C_{70}$. The poor solvent may include isopropanol, methanol, ethanol, acetone, propanol, butanol, acetonitrile, hexane, or mixtures thereof.

In the preparation method the allowing the mixed dispersion to stand may be performed for 2 days to 10 days in order to obtain the desired precipitates.

According to one embodiment of the preparation method, the interface of the step (a) may distinguish a colored mesitylene layer and a colorless transparent poor solvent layer. According to a specific embodiment of the preparation method, the concentration of the mesitylene solution of $C_{70}$ before adding the poor solvent in the step (a) may be 0.1 mg $C_{70}$/mL to about 0.4 mg $C_{70}$/mL.

The above-explained method of preparing a cube-shaped crystalline $C_{70}$ aggregate by slow addition of a poor solvent may provide an aggregate with a relatively wide size distribution.

It is believed that the aggregate preparation method by slow addition of the poor solvent and non-dispersion relies on slow diffusion through an interface between mesitylene and the poor solvent (liquid-liquid diffusion).

According to another embodiment, the preparation method may further include (b') shaking the mixed dispersion or treating it by sonication, after the step and (b), and (c) additionally allowing the resulting material to stand. At this time, the allowing the mixed dispersion to stand may be performed for short times, for example, about 5 minutes to 30 minutes.

The sonication may include ultrasonication.

The additionally allowing the resulting material to stand may be about 2 hours to about 5 hours.

In the preparation method of a $C_{70}$ aggregate by slow addition of a poor solvent, the poor solvent may be added to the mesitylene solution of $C_{70}$ to get a volume ratio of mesitylene solution to poor solvent of about 1:1 about 1:6, specifically, about 1:2 to about 1:6, and more specifically about 1:2 to about 1:4.

The $C_{70}$ aggregate obtained by the preparation method of an aggregate by slow addition of the poor solvent may include a $C_{70}$·2mesitylene aggregate. The $C_{70}$·2mesitylene aggregate may include a cube-shaped crystalline $C_{70}$ aggregate having clear edges. The obtained $C_{70}$ aggregate may also include "¬" or "⊏" shaped $C_{70}$ aggregate crystals that may be engaged to form almost a cube shape, as well as the cube-shaped crystals. Further, a part of the obtained cube-shaped $C_{70}$ aggregate may have at least one dent appearing as a hole on at least one cube surface, when observed with an electron microscope. According to one embodiment, the dent may be located in the center of the cube surface.

According to yet another aspect of the invention, a method of preparing a cube-shaped crystalline $C_{70}$ aggregate is provided that includes rapidly adding a poor solvent to a mesitylene solution of $C_{70}$, and dispersing a resulting mixed dispersion. The $C_{70}$ aggregate obtained by the above preparation method has a high ratio of a cube-shaped crystalline $C_{70}$ aggregate and a narrow size distribution of cube-shaped aggregate. Further, according to the preparation method, shape deviation of the cube-shaped $C_{70}$ aggregate may be reduced to obtain a uniform aggregate.

According to the preparation method, the mixed dispersion is dispersed simultaneously with or immediately after adding the poor solvent, and for example, mesitylene and the poor solvent may be uniformly dispersed by stirring, shaking, or sonication, and the like. Specifically, the preparation method includes:

(a) adding a poor solvent selected from isopropanol, methanol, ethanol, acetone, or a mixed solvent thereof to a mesitylene solution of $C_{70}$ to prepare a mixed dispersion, wherein the mixed dispersion is dispersed simultaneously with or immediately after adding the poor solvent; and (b) allowing the mixed dispersion to stand so that a $C_{70}$ aggregate may be precipitated.

According to one embodiment of the preparation method, in the step (a), the poor solvent is added at a rate where an interface distinguishing a poor solvent layer and a mesitylene layer is not maintained at least in the mixed dispersion. The poor solvent may include isopropanol, methanol, ethanol, acetone, propanol, butanol, acetonitrile, hexane, or mixtures thereof.

According to one embodiment of the preparation method, in the step (a), the mixed dispersion may be dispersed by stirring, sonication, shaking, and the like. For example, the mixed dispersion may be dispersed by ultrasonication.

According to one embodiment of the preparation method, in the step (a), the concentration of the mesitylene solution of $C_{70}$ before adding the poor solvent may be about 0.1 mg $C_{70}$/mL-about 0.4 mg $C_{70}$/mL, and the poor solvent may be added to the mesitylene solution of $C_{70}$ to get a volume ratio of mesitylene solution to poor solvent of about 1:1 to about 1:6, specifically about 1:2 to about 1:6, and more specifically about 1:2 to about 1:4.

In the preparation method the allowing the mixed dispersion to stand may be performed for 2 hours to 24 hours in order to obtain the desired precipitates.

Using the preparation method by rapid addition of the poor solvent and dispersion of the mixed dispersion, the size of a cube-shaped $C_{70}$ aggregate may be easily controlled. Specifically, as the concentration of the $C_{70}$ mesitylene solution before adding the poor solvent (hereinafter referred to as "start concentration") is lowered or the ratio of the poor solvent to the mesitylene solution is reduced, the average size of the cube-shaped $C_{70}$ aggregate obtainable by the preparation method may be increased.

Without being bound to a specific theory regarding the effect of the start concentration and the ratio of mesitylene solution to poor solvent on the $C_{70}$ aggregate, it is believed that since a mesitylene cavity is dispersed in a poor solvent, as the amount of the poor solvent is relatively increased, the average size of the mesitylene cavity and the number of $C_{70}$ molecules included therein are decreased, and thus the size of the $C_{70}$ aggregate including a cube is decreased. Meanwhile, as the start concentration of the mesitylene solution is higher, nucleation becomes frequent, thus giving a lot of small $C_{70}$ aggregate. The effect of the start concentration coincides well with a competitive relationship between nucleation and crystal growth, which is a general theory explaining the generation of precipitation.

The $C_{70}$ aggregate obtained by the preparation method using rapid addition of the poor solvent and dispersion of the mixed dispersion may include a $C_{70}$·2mesitylene aggregate. The $C_{70}$·2mesitylene aggregate may include a cube-shaped crystalline $C_{70}$ aggregate having clear edges. The obtained $C_{70}$ aggregate may also include "¬" or "⊏" shaped aggregate crystals that may be engaged with each other to form almost a cube shape, as well as cube-shaped crystals. Further, a part of the obtained cube-shaped $C_{70}$ aggregate may have at least one dent appearing as a hole on at least one cube surface, when observed with an electron microscope. According to one embodiment, the dent may be located in the center of the cube surface.

Using the preparation method by rapid addition of the poor solvent and dispersion of the mixed dispersion, the ratio of the cube-shaped $C_{70}$ aggregate having the dent may be controlled. For example, as the concentration of the $C_{70}$ mesitylene solution is increased, and as the amount of the poor solvent is increased, the ratio of the cube-shape aggregate having a dent may be increased.

Since the above-explained cube-shaped crystalline $C_{70}$·2mesitylene aggregate has high crystallinity with $C_{70}$ molecules being arranged with high regularity, it may have a remarkably improved photoluminescence characteristic, compared to a common non-crystalline $C_{70}$ powder.

According to yet another aspect of the invention, a method of preparing a cube-shaped crystalline $C_{70}$ non-solvent aggregate from the cube-shaped crystalline $C_{70}$·2mesitylene aggregate by thermal annealing is provided. The preparation method of the non-solvent aggregate includes (a) preparing a $C_{70}$ aggregate including a cube-shaped crystalline $C_{70}$·2mesitylene aggregate, and (b) treating the $C_{70}$ aggregate by thermal annealing under a reducing or inert atmosphere.

In the step (a), the preparation of the $C_{70}$ aggregate including a cube-shaped crystalline $C_{70}$·2mesitylene aggregate may be conducted using one of the above-explained methods. Further, other methods not described herein may be used.

In the step (b), the annealing may include heating the $C_{70}$·2mesitylene aggregate to a high temperature under a reducing or inert atmosphere to remove mesitylene in the aggregate crystal.

According to one embodiment of conducting the step (b), the reducing or inert atmosphere may include hydrogen, nitrogen, helium, argon, and the like, and a mixed gas thereof.

The thermal annealing condition for conducting the step (b) may include heating at a temperature of from about 230° C. to about 320° C. for about 3 to 5 hours. One of ordinary knowledge in the art may determine a time when a weight decrease of the $C_{70}$·2mesitylene aggregate no longer occurs as the end of the thermal annealing step.

EXAMPLES

Hereinafter, the embodiments are illustrated in more detail with reference to examples and drawings. However, the following are exemplary embodiments and do not limit the present invention.

Example 1

Preparation of $C_{70}$ Aggregate by Slow Addition of Poor Solvent $C_{70}$ powder (95% purity) (USA, Materials and Electrochemical Research (MER) Corporation) was dissolved in mesitylene (USA, Sigma-Aldrich Co.) to prepare a solution of about 0.2 mg/mL. To a vial including the solution, isopropanol was added slowly as a poor solvent to get a volume ratio of mesitylene solution to isopropanol of about 1:4, along the wall of the vial such that a dark brown mesitylene layer and a colorless transparent isopropanol layer are not mixed and are distinguished by a clear interface. The vial including the mixed dispersion was allowed to stand for about 5 minutes, shaken by hand, and allowed to stand at room temperature without further agitation. Fine black color precipitation began to sink after about 3 hours, and the precipitation was collected about 24 hours after being allowed to stand. The $C_{70}$ aggregate precipitation was put in an open space of ambient conditions, and allowed to stand for about 24 hours to remove remaining solvent. Subsequently, characteristics of the $C_{70}$ aggregate were analyzed.

Figure 2:
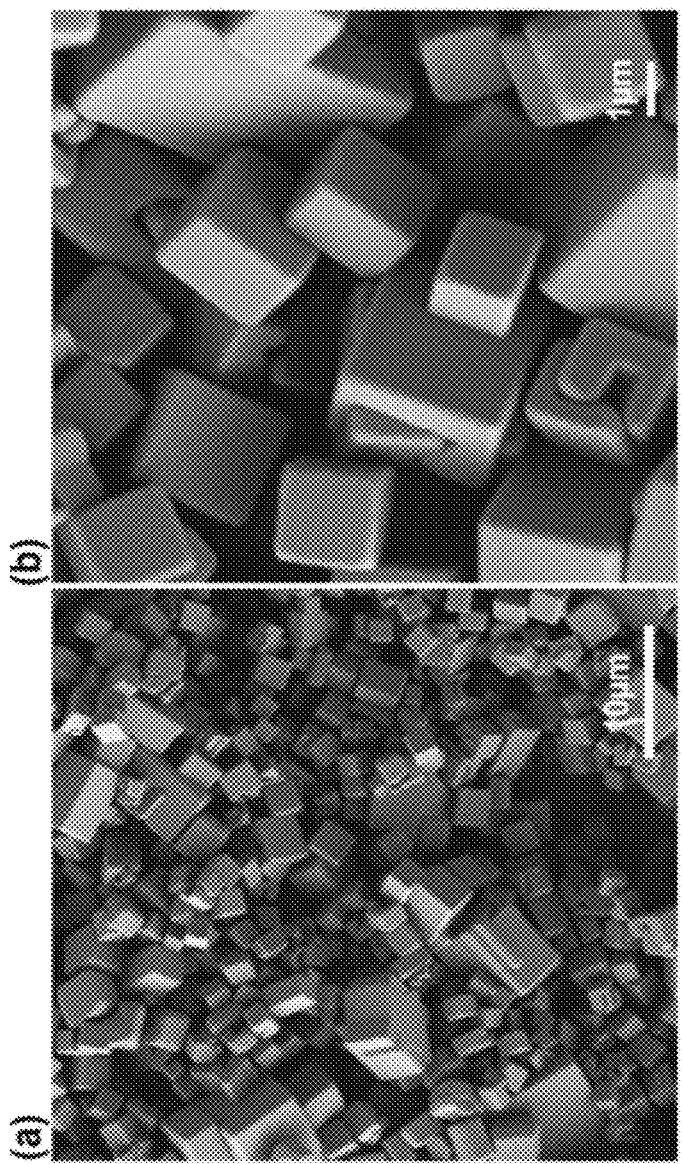
FIG. 2 is a scanning electron microscope photograph showing a $C_{70}$ aggregate produced when isopropanol is slowly added to a mesitylene solution of $C_{70}$ without sonication.

The result of observing the $C_{70}$ aggregate prepared in Example 1 with an electron microscope is shown in FIG. 2. (a) of FIG. 2 is a scanning electron microscope photograph of the $C_{70}$ aggregate sample, and FIG. 2 (b) is an enlarged view of 2 (a). As the scanning electron microscope, JSM-7401F equipment (Japan, JEOL Ltd.) was used. As shown in the electron microscope photographs of FIG. 2, the $C_{70}$ aggregate also includes "⌐" and "⊏" shaped crystals that may be engaged to form almost a cube shape, as well as cube-shaped crystals having clear edges. The result of FIG. 2 suggests that according to the preparation method of Example 1, nucleation producing a $C_{70}$ aggregate occurs at various scales.

Example 2

Preparation of $C_{70}$ Aggregate by Raid Addition of Poor Solvent and Sonication 95% $C_{70}$ (USA, MER Corporation) was dissolved in mesitylene to prepare a solution of about 0.2 mg/mL. To a vial including the solution, isopropanol was rapidly (within about 3 to 4 seconds) added to get a volume ratio of mesitylene solution to isopropanol of 1:4, and the mixed dispersion was immediately ultrasonicated for about 30 seconds. The dark brown $C_{70}$ mesitylene solution became light, and the ultrasonicated product was allowed to stand at room temperature for about 24 hours. Precipitation progressed during this time, $C_{70}$ aggregate was precipitated at the bottom of the vial, and finally the mixed dispersion became colorless and transparent. It took about 5 hours until the precipitation completely sank to the bottom of the vial.

Figure 3:
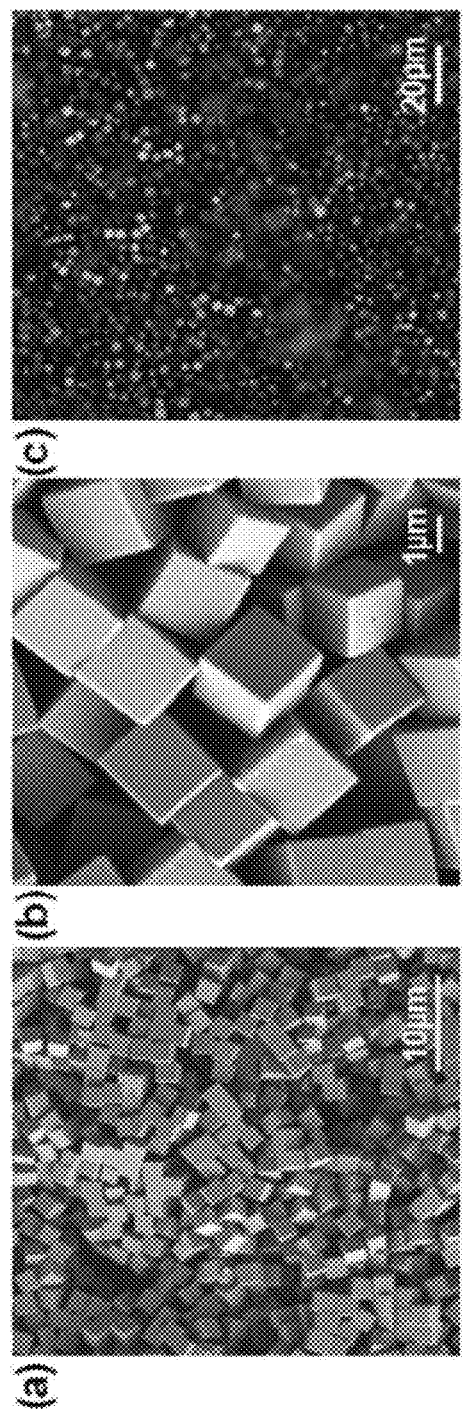
FIG. 3 is a scanning electron microscope photograph showing a $C_{70}$ aggregate produced when isopropanol is rapidly added to a mesitylene solution of $C_{70}$ and sonicated.

The $C_{70}$ aggregate prepared in Example 2 was observed with a scanning electron microscope. (a) of FIG. 3 is an electron microscope image of the $C_{70}$ aggregate sample, and (b) of FIG. 3 is an enlarged view of the same sample. Comparing the $C_{70}$ aggregate obtained in Example 2 with the $C_{70}$ aggregate of Example 1, although it includes "⌐" or "⊏" shaped crystals that may be engaged with each other, the ratio of $C_{70}$ cube aggregate in the entire $C_{70}$ aggregate is much higher, the cube shape is clearer, and shape deviation is smaller thus close to a hexahedron. Further, the cubes obtained in Example 2 have a much narrower size distribution than the cubes of Example 1. (c) of FIG. 3 is a bright field reflection type optical microscope image of the aggregate sample, showing that the $C_{70}$ aggregate has a glossy, slightly yellow metallic surface. From (c) of FIG. 3, it is assumed that the surface of the $C_{70}$ aggregate has high free electron density.

In FIG. 3, the average size (lengths of the longest sides) of the $C_{70}$ aggregate is about 2.05 μm, and the size distribution of the cube-shaped $C_{70}$ aggregate is much narrower than the $C_{70}$ aggregate of FIG. 2 having the average size of about 2 μm. The uniform size distribution indicates that, according to the preparation method of a $C_{70}$ aggregate by rapid addition of a poor solvent and sonication, nucleation occurs more uniformly than Example 1. In Example 2, the color of the mixed dispersion changed from light reddish brown to dark brown within the first 30 seconds, and such color change also occurred in the preparation process of Example 1 without ultrasonication.

Without being bound by a specific theory regarding the principle of production of the cube-shaped crystalline $C_{70}$ aggregate, it is believed that spontaneous crystallization of $C_{70}$ by addition of a poor solvent occurs almost in a moment. Only from the color change of the mixed dispersion is it judged that there is little difference between the growth rate of $C_{70}$ crystal in Examples 1 and 2, irrespective of sonication treatment. However, the cube-shape deviation of the $C_{70}$ aggregate was decreased much according to sonication, and the size distribution also narrowed. For illustrative explanation for understanding, it is considered that mesitylene cavities which become a seed for the $C_{70}$ aggregate crystal are dispersed well in the isopropanol poor solvent by ultrasonication, and the size of the mesitylene cavity and the number of $C_{70}$ molecules included therein become uniform. Meanwhile, if a $C_{70}$ aggregate is formed without ultrasonication, it is assumed that nucleation of the $C_{70}$ aggregate randomly occurs only by slow diffusion at the interface of mesitylene and isopropanol, and thus, the size of mesitylene cavities dispersed in isopropanol becomes irregular. As described above, it would be obvious to one of ordinary knowledge in the art that it is of no importance whether or not the above-explained principle regarding preparation of cube-shaped crystalline $C_{70}$ aggregate is correct.

Example 3

Preparation of Cube-Shape $C_{70}$ Aggregate Using Various Poor Solvents

In this example, a $C_{70}$ aggregate was prepared using a combination of various poor solvents and a mesitylene solvent. An aggregate was prepared by the same method as Example 2, except that the poor solvent was changed from isopropanol to (a) methanol, (b) ethanol, or (c) acetone.

Figure 4:
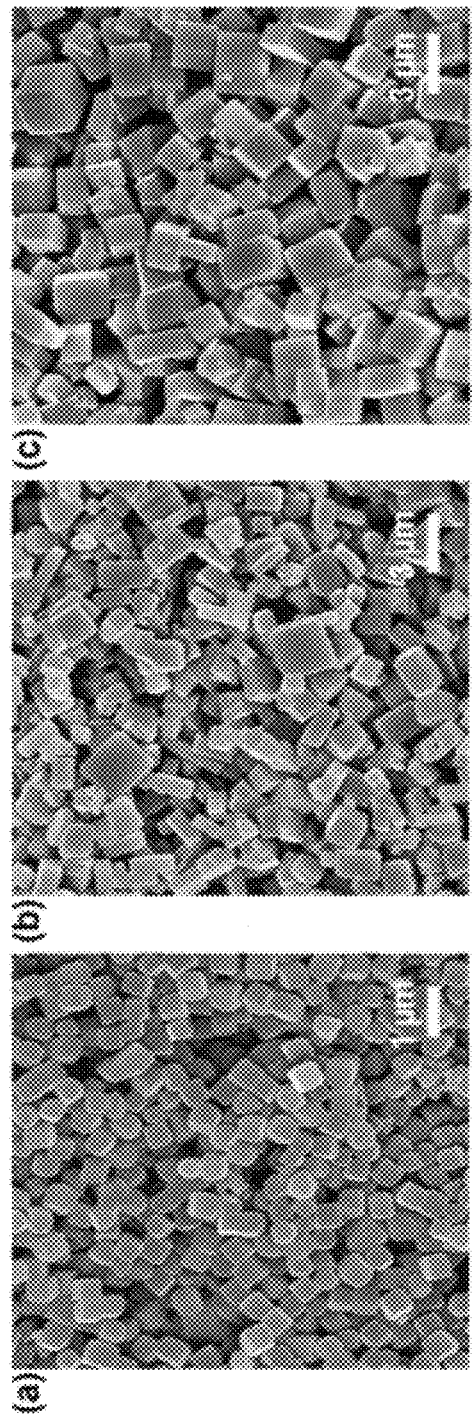
FIG. 4 is a scanning electron microscope photograph showing a $C_{70}$ aggregate produced when methanol, ethanol, or acetone is added to a mesitylene solution of $C_{70}$.

The results of observing the $C_{70}$ aggregate obtained in Example 3 with a scanning electron microscope are summarized in FIG. 4. (a) of FIG. 4 represents a $C_{70}$ aggregate obtained using a poor solvent of methanol, (b) of FIG. 4 represents ethanol, and (c) of FIG. 4 represents acetone. The $C_{70}$ aggregates obtained using the poor solvents are generally cube-shaped. The cube-shaped $C_{70}$ aggregate obtained in Example 3 has more gentle edges than the cube obtained in Example 2, and the sizes of the cubes are more various.

Example 4

Control of Cube Size by Changing Ratio of Poor Solvent and Mesitylene Solution and Concentration of $C_{70}$ The effect of the start concentration of $C_{70}$ molecules in a mesitylene solvent and the ratio of mesitylene solution and a poor solvent on a cube-shaped $C_{70}$ aggregate was examined. A $C_{70}$ aggregate was prepared by the same method as Example 2, except that the concentration of the $C_{70}$ mesitylene solution was changed to about 0.1 mg/mL, about 0.2 mg/mL, and about 0.4 mg/mL, and the ratio of isopropanol was changed to about 1:1, about 1:2, and about 1:4.

Figure 5:
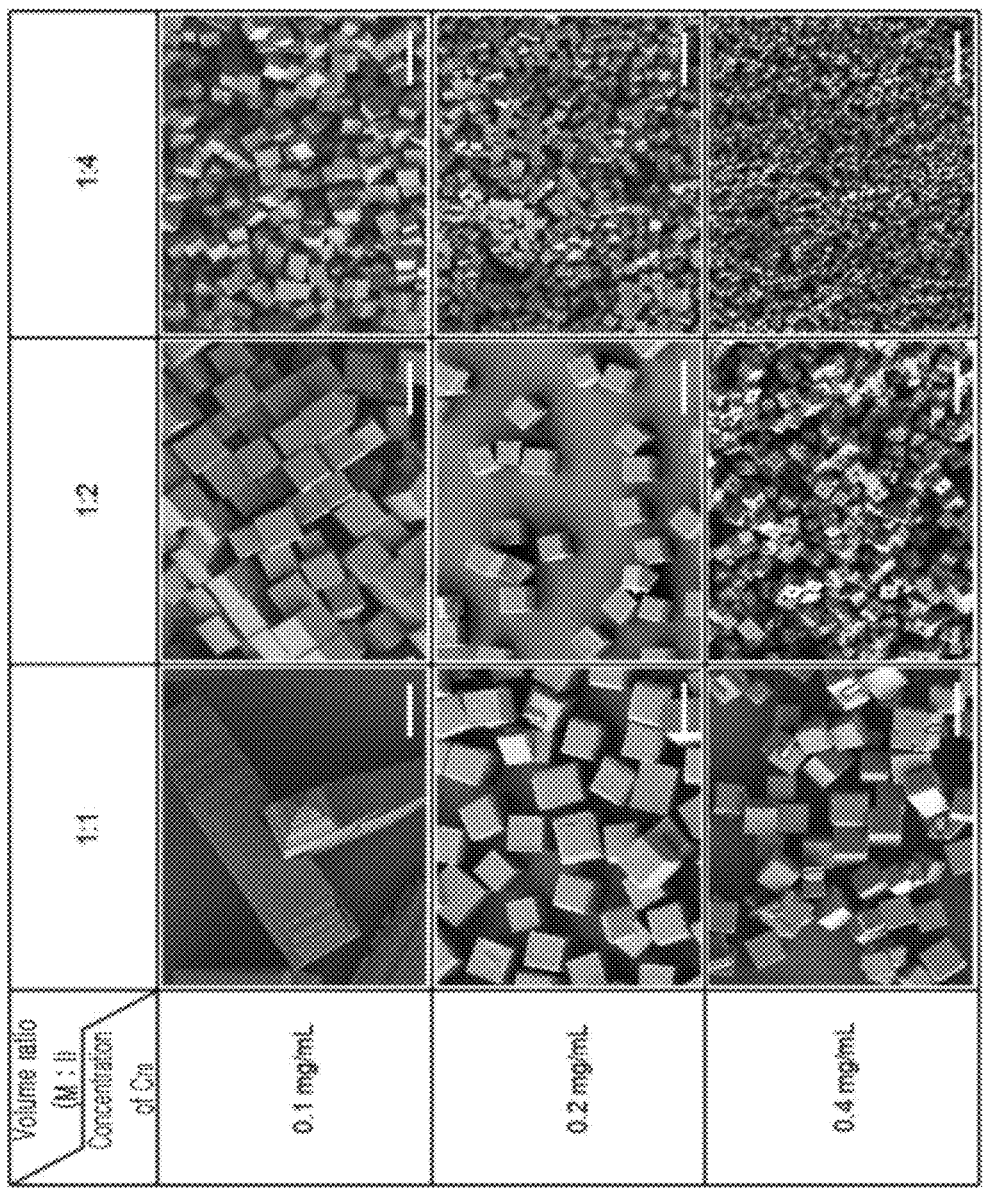
FIG. 5 is a scanning electron microscope photograph comparing $C_{70}$ cubes prepared according to the method of FIG. 3, with varying relative amounts of isopropanol and $C_{70}$ concentration of the mesitylene solution.

FIG. 5 shows $C_{70}$ aggregate obtained in Example 4, wherein M:I is a ratio of mesitylene solution to isopropanol, and the length of a graduated rod is 10 μm. The $C_{70}$ aggregates obtained in Example 4 include a high ratio of cube-shaped $C_{70}$ aggregates with uniform size, similar to the $C_{70}$ aggregate of Example 2. However, when the concentration of the mesitylene solution was about 0.1 mg/mL and the M:I ratio was about 1:1, pyramid-shaped crystals were obtained.

As shown in FIG. 5, as the relative amount of the poor solvent increases, or the $C_{70}$ concentration of the mesitylene solution increases, the average size of the cube-shaped $C_{70}$ aggregate decreases.

In FIG. 5, when M:I=1:2 and the concentration is 0.4 mg/mL, a plurality of cube surfaces (generally in the center) include dents appeared as a hole. Although not clearly shown in FIG. 5, the cubes wherein the concentration is 0.4 mg/mL and M:I=1:4 include dents more frequently.

Example 5

Analysis of Composition of $C_{70}$ Aggregate

Figure 6:
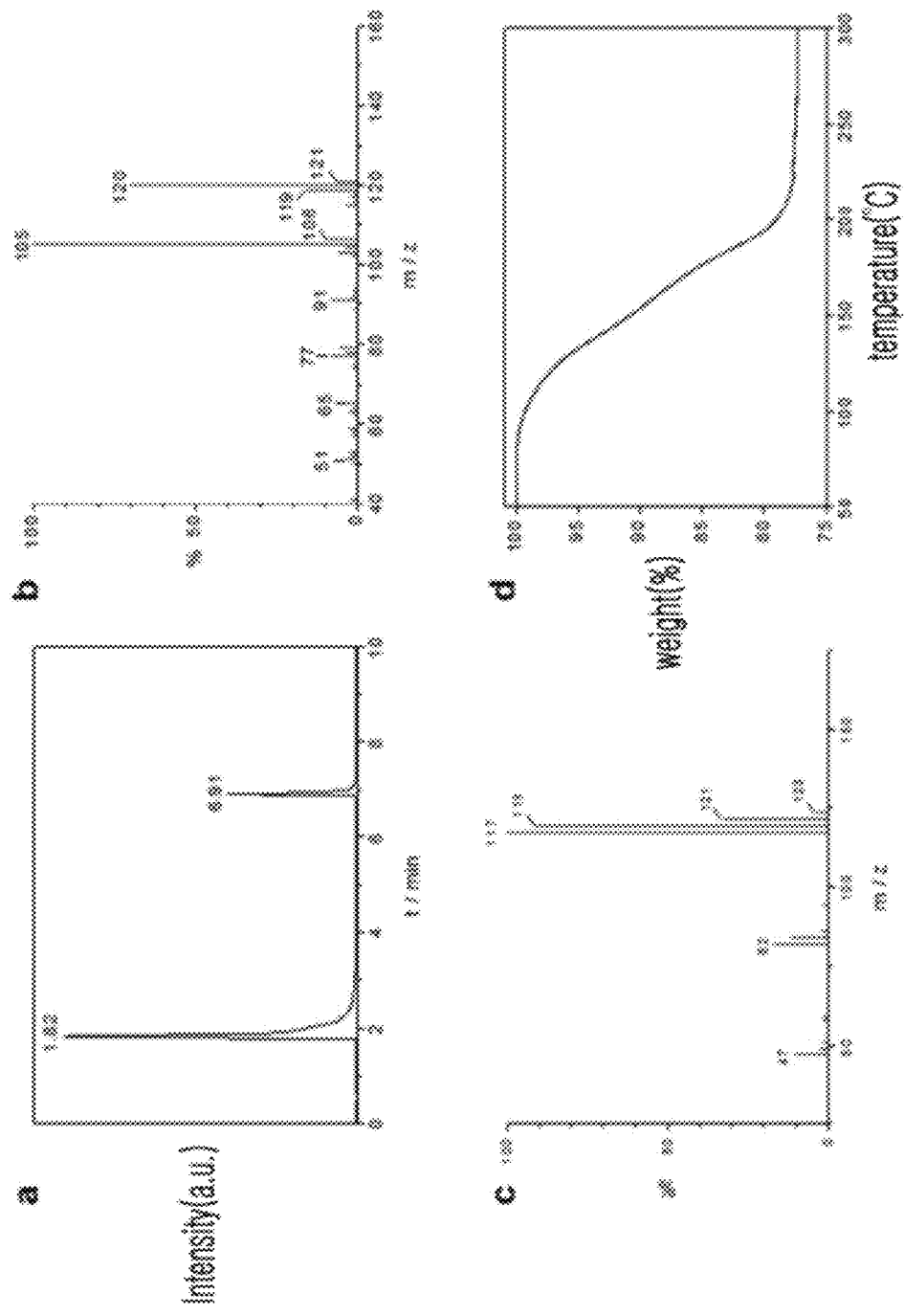
FIG. 6 is a graph showing the results of gas chromatography-mass analysis and thermal weight analysis of the $C_{70}$ aggregate prepared according to FIG. 3.

The chemical composition of a $C_{70}$ aggregate obtained using a mixed solvent of mesitylene-isopropanol was examined. The $C_{70}$ aggregate crystals of Example 2 were dissolved in carbon tetrachloride, and implanted in a gas chromatography-mass spectrometer (GC-MS). As shown in (a) of FIG. 6, two components with residence time of about 1.82 minutes and about 6.91 minutes appeared, the mass spectrum of the component with residence time of about 1.82 minutes is shown in (c) of FIG. 6, and the mass spectrum of the component with residence time of about 6.91 minutes is shown in (b) of FIG. 6. It was found by mass analysis that the component with residence time of about 1.82 minutes is carbon tetrachloride, and the component with residence time of about 6.91 minutes is mesitylene. A poor solvent of isopropanol was not detected. Without being bound by a specific theory regarding the formation of the $C_{70}$ aggregate, the fact that the $C_{70}$ aggregate does not include a poor solvent suggests that isopropanol does not participate in the formation of crystals and only induces the formation of a mesitylene cavity including the $C_{70}$ aggregate.

The compositional ratio of mesitylene and $C_{70}$ in the $C_{70}$ aggregate was examined by thermogravimetric analysis (TGA). As shown in (d) of FIG. 6, weight loss of about 22.7% occurs over a section of about 80° C. to 230° C., indicating that the $C_{70}$ aggregate prepared in Example 2 has a mole ratio of $C_{70}$ molecules to mesitylene of about 1:2.05.

From the GC-MS and TGA results, the composition of the $C_{70}$ aggregate was determined as $C_{70}$·2mesitylene ($C_{70}$·$2C_9H_{12}$).

Example 6

Preparation of $C_{70}$2Mesitylene Aggregate by Liquid-Liquid Diffusion $C_{70}$ powder (95% purity) (USA, Materials and Electrochemical Research (MER) Corporation) was dissolved in mesitylene (USA, Sigma-Aldrich Co.) to prepare a solution of about 0.2 mg/mL. Isopropanol was slowly added along the wall of a vial including the solution, such that a dark brown mesitylene layer and a colorless transparent isopropanol layer were not mixed and were distinguished by a clear interface. The vial including the mixed dispersion was allowed to stand for about 5 days so that the two liquids form one uniform phase through slow diffusion, thus obtaining large cube precipitation of $C_{70}$ at the bottom of the vial.

The size of the obtained $C_{70}$ aggregate crystal was about 10 μm to about 100 μm, and it included a square prism-shaped $C_{70}$ aggregate in addition to a cube-shape aggregate. The obtained $C_{70}$ aggregate was $C_{70}$·2mesitylene aggregate having clear edges.

Example 7

Crystal Structure Analysis of $C_{70}$.2Mesitylene Aggregate at a Temperature of 90K Among the $C_{70}$.2mesitylene aggregate crystals obtained in Example 6, cubes were selected and analyzed by monocrystalline X-ray diffraction at a temperature of 90K. Monocrystalline X-ray diffraction analysis of the crystal was attempted at room temperature, but sufficient data was not obtained. Similar difficulty has been reported in the monocrystalline X-ray diffraction analysis of $C_{60}$.

The cube crystal obtained in Example 6 was moved to a glass slide using a pipette, and put in a monocrystalline X-ray diffractometer using a microneedle. Full sphere diffraction data was collected using APEX II Quazar equipment (German Bruker Company, located in Pohang University of Science and Technology) and an ADSC Quantum 210 detector of 6B2 beamline (Pohang Accelerator Laboratory).

Figure 7:
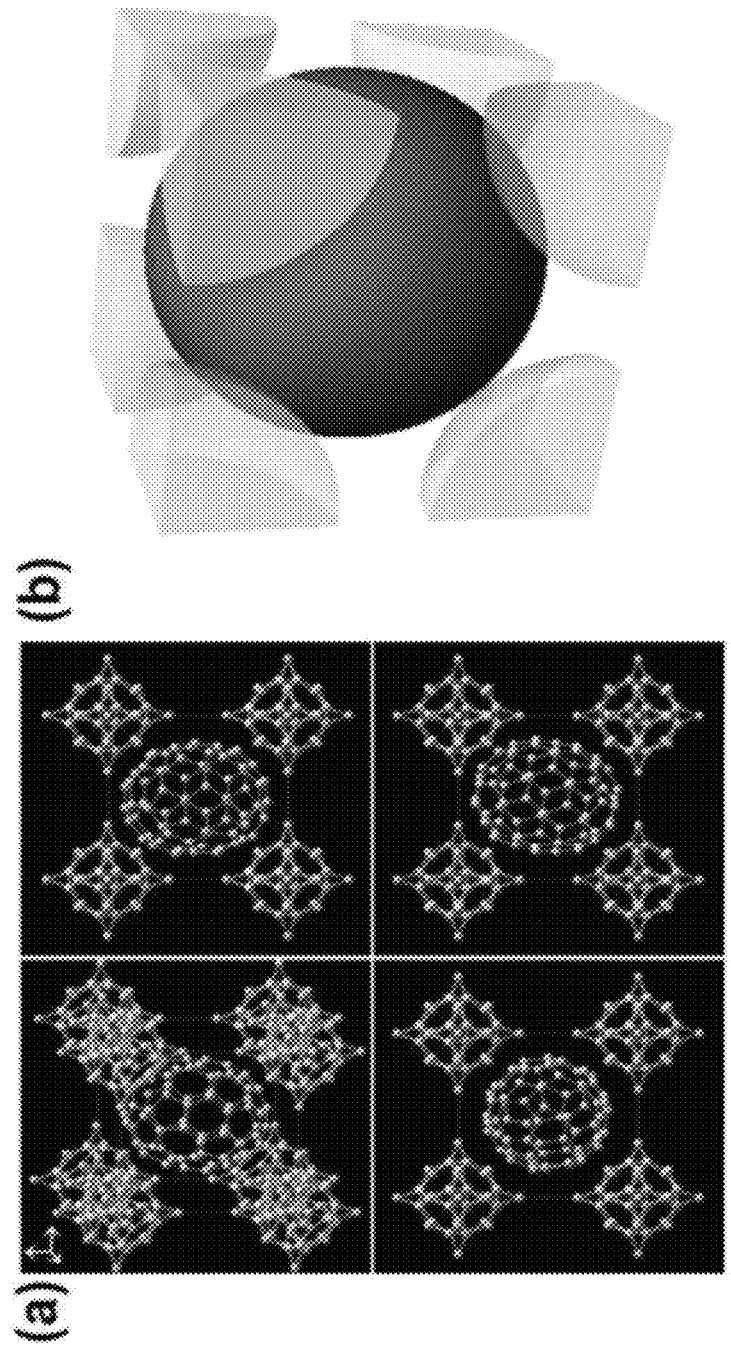
FIG. 7 shows a crystal structure of a cube-shaped $C_{70}$ monocrystalline aggregate at a temperature of 90K prepared according to liquid-liquid diffusion of mesitylene and isopropanol.

The cube-shaped $C_{70}$.2mesitylene aggregate had a simple cubic unit cell, and had a lattice constant of a=b=c of about 10.4774 (approximately, 10.48 Å) and a space group of about P$\bar{4}$3m. As the results of model analysis and Fourier synthesis, a structure wherein mesityelene is located in each corner of a unit cell with a 20% R factor value and a $C_{70}$ molecule is located in the center is obtained. The crystal structure is shown in FIG. 7. The upper left of (a) of FIG. 7 shows a general shape of a unit cell, the upper right is the unit cell shown in the 'a' direction, the lower left is the unit cell shown in the 'b' direction, and the lower right is the unit cell shown in the 'c' direction. (b) of FIG. 7 is a schematic view of a unit cell of a $C_{70}$.2mesitylene cube crystal. The red circle in the center denotes a $C_{70}$ molecule, and the gray part in each corner denotes mesitylene electron density.

Example 8

Crystal Structure Analysis of $C_{70}$.2Mesitylene Aggregate at a Temperature of 300K To confirm whether the structure of the $C_{70}$ cube.2mesitylene crystal identified in Example 7 is maintained at room temperature, X-ray powder diffraction analysis was conducted at a temperature of about 300K. The X-ray powder diffraction analysis was conducted using a synchrotron (5C2 beamline) X-ray source with an emission wavelength of about 1.23956 Å (Pohang Accelerator Laboratory).

Figure 8:
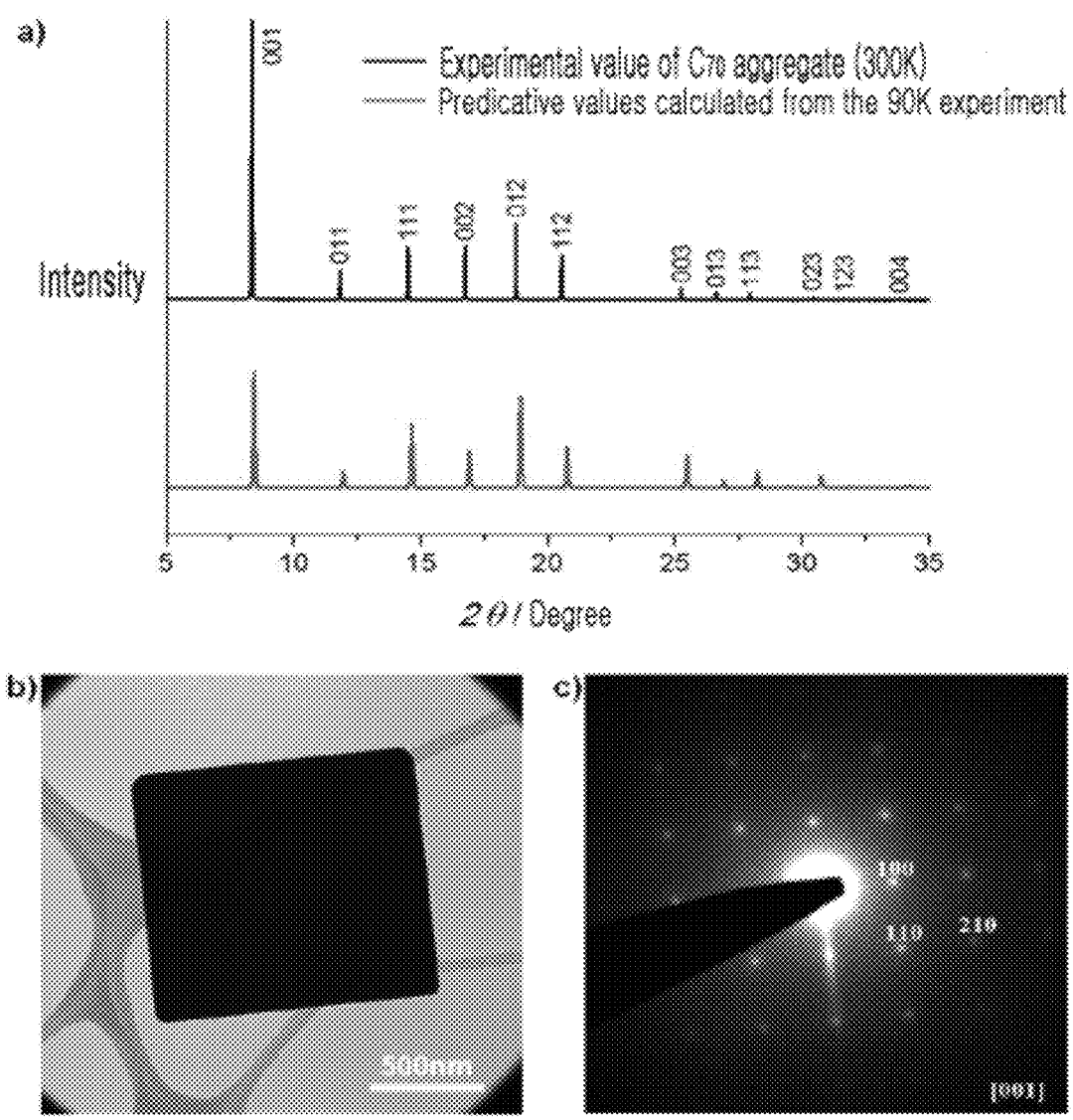
FIG. 8 shows a crystal structure of a cube-shaped $C_{70}$ aggregate at a temperature of 300K, analyzed by X-ray powder diffraction, transmission electron microscope, and electron diffraction.

As shown in the X-ray diffraction angle graph of (a) of FIG. 8, a diffraction peak strongly appeared in the diffraction data (black color) at a temperature of 300K, which corresponds to the predicative value calculated from the 90K structure of Example 7. From the result, it is confirmed that a $C_{70}$ cube.2mesitylene crystal at a temperature of 300K also has a simple cube-shaped structure (a=10.59 Å). Thus, it can be seen that the structure of a $C_{70}$ cube.2mesitylene crystal at room temperature is identical to the crystal structure at a temperature of 90K, except that the lattice constant is slightly increased.

(b) of FIG. 8 is a transmission electron microscope (TEM) image obtained from an electron beam vertically irradiated to the surface of the crystal sample, and FIG. 8 (c) is an elective area electron diffraction (SAED) pattern corresponding to FIG. 8 (b). To obtain the transmission electron microscope image and electron diffraction pattern, JEM 3010 equipment (Japan, JEOL Ltd.) was used at an accelerated voltage of about 300 kV. From the data shown in (a) of FIG. 8 and (c) of FIG. 8, it was found that each side {100} of the cube-shaped $C_{70}$ aggregate crystal corresponds to a family plane, which coincides well with the X-ray powder diffraction result.

Example 9

Figure 9:
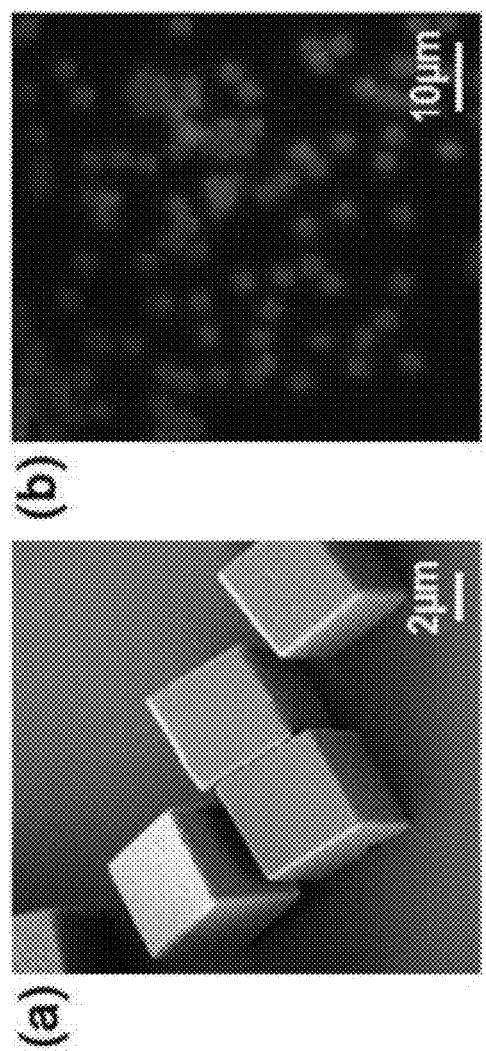
FIG. 9 shows a cube-shaped $C_{70}$ aggregate and the fluorescent optical microscope image.

Analysis of Photoluminescence Characteristic of $C_{70}$.2Mesitylene Aggregate The photoluminescence characteristic of a cube-shaped $C_{70}$.2mesitylene aggregate was examined. FIG. 9 shows a cube-shaped $C_{70}$.2mesitylene aggregate (a) and corresponding fluorescent optical microscope image (b). In (b) of FIG. 9, the cube-shaped $C_{70}$.2mesitylene aggregate appeared as bright red, the excitation wavelength was about 510 to 560 nm, and the emission wavelength was about 660 to 710 nm.

Figure 10:
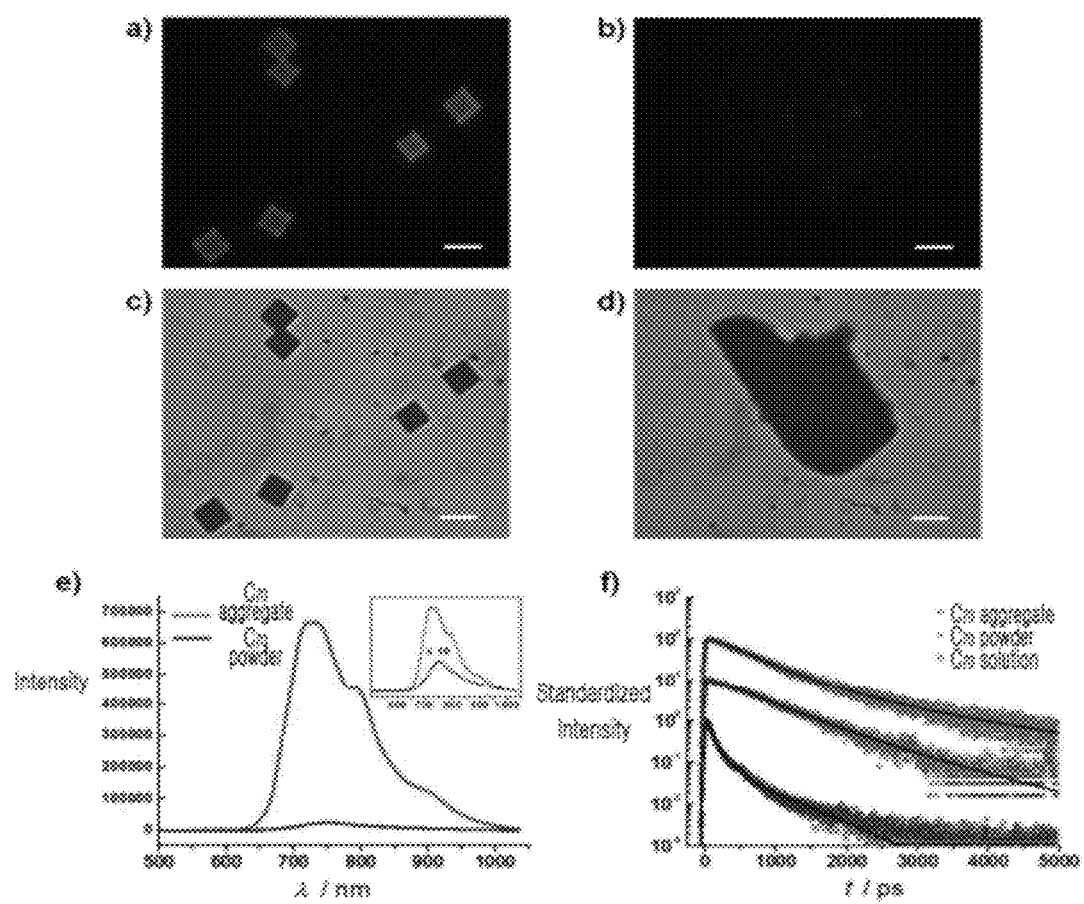
FIG. 10 shows microscope photographs and photoluminescence spectra comparing photoluminescence characteristics of a cube-shaped $C_{70}$ aggregate and $C_{70}$ powder, and time-resolved photoluminescence spectra of a $C_{70}$ aggregate, a $C_{70}$ powder, and a $C_{70}$ solution observed at 750 nm.

To examine the effect of the condition of $C_{70}$ aggregation on the photoluminescence characteristic, photoluminescence of the $C_{70}$.2mesitylene aggregate and $C_{70}$ powder was compared. (a) and (c) of FIG. 10 are respectively an image of the $C_{70}$.2mesitylene aggregate observed with a fluorescent optical microscope and a transmission optical microscope, and (b) and (d) of FIG. 10 are respectively an image of $C_{70}$ powder observed with a fluorescent optical microscope and a transmission optical microscope (graduated rod size 10 μm). It can be seen that little light emission is observed in the $C_{70}$ powder, while photoluminescence of the cube-shaped $C_{70}$.2mesitylene aggregate is very strong.

For a detailed analysis, photoluminescence spectrums of the $C_{70}$ powder and cube-shaped $C_{70}$.2mesitylene aggregate are shown in (e) of FIG. 10. It is confirmed by (e) of FIG. 10 that photoluminescence of the $C_{70}$.2mesitylene aggregate (red) is much stronger than that of the $C_{70}$ powder, and the right upper box of (e) of FIG. 10 is a graph of only the spectrum of the $C_{70}$ powder 10 times enlarged for comparison. It can be seen that even if enlarged 10 times, the spectrum of the $C_{70}$ powder is weaker than that of the cube-shaped $C_{70}$.2mesitylene aggregate. In (e) of FIG. 10, photoluminescence of the cube-shaped $C_{70}$.2mesitylene aggregate is about 30 times stronger than that of the $C_{70}$ powder. However, considering that the $C_{70}$ powder is introduced in an excess amount compared to the aggregate due to very weak photoluminescence (see (c) and (d) of FIG), it is obvious that the gap should largely exceed by about 30 times when photoluminescence is measured with the same amount.

Example 10

Analysis of Time-Resolved Photoluminescence of $C_{70}$.2Mesitylene Aggregate To thoroughly examine the effect of high crystallinity of the cube shape on photoluminescence of the $C_{70}$ aggregate, time-resolved photoluminescence analysis of the $C_{70}$.2mesitylene aggregate was conducted.

(f) of FIG. 10 shows time-resolved photoluminescence spectra of cube-shaped $C_{70}$.2mesitylene aggregate (red), $C_{70}$ mesitylene solution (green), and $C_{70}$ powder (blue) samples, analyzed at about 750 nm. To prevent confusion due to overlap of data, in the graph of (f) of FIG. 10, photoluminescence intensities of $C_{70}$.2mesitylene aggregate (red) and $C_{70}$ solution are artificially increased by two exponential sizes and shown. In the time-resolved spectrum, the time constant of photolysis decay is about 510 ps (91%) and about 1.6 ns (9%) for the $C_{70}$ aggregate, about 560 ps (85%) and about 1.1 ns (15%) for the $C_{70}$ solution, and about 40 ps (45%), about 100 ps (50%), and about 610 ps (5%) for the $C_{70}$ powder.

The photoluminescence decay behavior of $C_{70}$·2mesitylene aggregate is similar to the optical transfer behavior in a solution phase wherein $C_{70}$ molecules individually exist in terms of the time constant. Without being bound by a specific theory regarding explanation of photoluminescence of the cube-shaped crystalline $C_{70}$ aggregate, the above results suggest that interaction between the $C_{70}$ molecules in the crystal is insignificant, and remarkable improvement in photoluminescence of the aggregate arises from the high crystalline arrangement of $C_{70}$ molecules, not from mesitylene existing in the crystal.

Example 11

Preparation of Cube-Shaped $C_{70}$ Non-Solvent Aggregate

In the above thermal weight analysis, weight loss of $C_{70}$·2mesitylene aggregate no longer appearing at a temperature of about 230° C. or more was examined. To prepare a $C_{70}$ non-solvent aggregate, a $C_{70}$·2mesitylene aggregate according to Example 2 was treated by thermal annealing. A cube-shaped $C_{70}$·2mesitylene aggregate of an average size of about 2 μm was heated to about 300° C. for about 3 hours under a hydrogen atmosphere to remove mesitylene in the $C_{70}$·2mesitylene aggregate.

Figure 11:
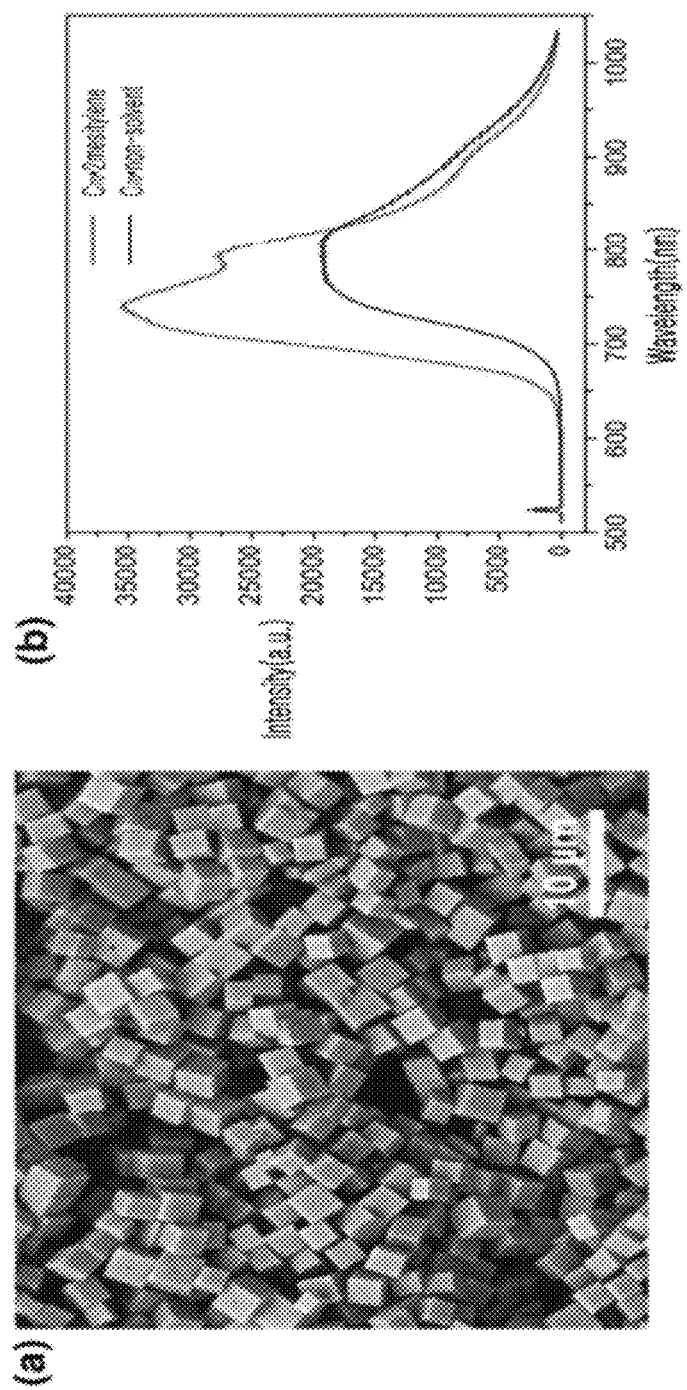
FIG. 11 is a scanning electron microscope photograph of a cube-shaped $C_{70}$ aggregate that does not include mesitylene in the crystal structure, and a graph showing the photoluminescence characteristic.

The $C_{70}$ non-solvent aggregate crystal prepared by thermal annealing still maintained a cube shape ((a) of FIG. 11 when observed with a scanning electron microscope, and showed a weaker photoluminescence spectrum than that of the $C_{70}$·2mesitylene aggregate but a much stronger one than that of the $C_{70}$ powder ((b) of FIG. 11).

The fact that the mesitylene free $C_{70}$ aggregate shows a largely improved photoluminescence characteristic compared to the $C_{70}$ powder suggests that strong photoluminescence of the cube-shaped $C_{70}$·2mesitylene aggregate or the $C_{70}$ non-solvent aggregate is derived from the spatial characteristic of $C_{70}$ aggregate where $C_{70}$ is arranged as a cube shape while maintaining high crystallinity, not from mesitylene. Further, the conclusion coincides well with the result of the time-resolved photoluminescence experiment of Example 10.

As explained, it is confirmed that the crystalline $C_{70}$ aggregate of the present invention has a well-defined cube-shape and an excellent photoluminescence characteristic, and the size and shape of the crystalline $C_{70}$ aggregate may be easily controlled using a mixed solvent.

Although the invention is explained with reference to the specific embodiment and drawings, these are presented only as examples for general understanding of the invention. Further, the invention is not limited to the disclosed embodiments, but as various modifications would be obvious to one of ordinary knowledge in the art, such modifications are within the spirit of the invention. Therefore, all equivalents to the claims and modified embodiments, as well as the above-explained embodiments and the appended claims, are within the range of the spirit of the invention.

What is claimed is:

1. A cube-shaped C70 fullerene aggregate comprising: a plurality of C70 molecules aggregated in the shape of a cube, wherein the cube-shaped $C_{70}$ fullerene aggregate is crystalline and is a non-solvent aggregate.

2. The fullerene aggregate of claim 1, wherein the $C_{70}$ non-solvent aggregate includes $C_{70}$ molecules forming a cubic crystal structure.

3. The fullerene aggregate of claim 2, wherein the cubic crystal structure is a face centered cubic system.

4. A fullerene aggregate comprising: a cube-shaped crystalline $C_{70}$·2mesitylene aggregate.

5. The fullerene aggregate of claim 4, wherein the $C_{70}$·2mesitylene aggregate includes $C_{70}$ molecules form a cubic crystal structure.

6. The fullerene aggregate of claim 5, wherein the cubic crystal structure is a simple cubic system.

7. The fullerene aggregate of claim 5, wherein the cubic crystal has a lattice constant of about 10.48 Å at about 90K or about 10.59 Å at 300K.

8. The fullerene aggregate of claim 4, wherein the length of the longest side of the $C_{70}$·2mesitylene aggregate is about 0.1 μm to about 100 μm.

9. A method for preparing a $C_{70}$ aggregate comprising:
(a) adding a poor solvent selected from isopropanol, methanol, ethanol, acetone, propanol, butanol, acetonitrile, and hexane, or a mixed solvent thereof, to a mesitylene solution of $C_{70}$ to prepare a mixed dispersion, wherein the poor solvent is slowly added below or equal to a rate where an interface distinguishing the mesitylene layer and the poor solvent layer is maintained in the mixed dispersion; and
(b) allowing the mixed dispersion to stand so that a $C_{70}$ aggregate may be precipitated.

10. The method of claim 9, wherein the interface of the step (a) distinguishes a colored mesitylene layer and a colorless transparent poor solvent layer.

11. The method of claim 9, wherein in the (a) step, the concentration of the mesitylene solution of the $C_{70}$ before adding the poor solvent is about 0.1 mg $C_{70}$/mL to about 0.4 mg $C_{70}$/mL.

12. The method of claim 9, further comprising after the step (b),
(b') shaking the mixed dispersion or treating it by sonication.

13. The method of claim 9, wherein the poor solvent is added to the mesitylene solution of $C_{70}$ to get a volume ratio of mesitylene solution to poor solvent of about 1:1 to about 1:6.

14. The method of claim 9, wherein the $C_{70}$ aggregate includes a cube-shaped crystalline $C_{70}$·2mesitylene aggregate having a cubic crystal structure.

15. The method of claim 14, wherein a part of the cube-shaped crystalline $C_{70}$·2mesitylene aggregate includes a dent on at least one side of the cube.

16. The method of claim 15, wherein the dent is located in the center of the cube side.

17. A method for preparing a $C_{70}$ aggregate comprising:
(a) adding a poor solvent selected from isopropanol, methanol, ethanol, acetone, propanol, butanol, acetonitrile, and hexane, or a mixed solvent thereof, to a mesitylene solution of $C_{70}$ to prepare a mixed dispersion, wherein the mixed solution is sonicated simultaneously with or immediately after adding the poor solvent; and
(b) allowing the mixed dispersion to stand so that a $C_{70}$ aggregate may be precipitated.

18. The method of claim 17, wherein the poor solvent of the step (a) is added at a rate where an interface distinguishing a poor solvent layer and a mesitylene layer is not maintained at least in the mixed dispersion.

19. The method of claim 17, wherein in the step (a), the concentration of the mesitylene solution of $C_{70}$ before adding the poor solvent is about 0.1 mg $C_{70}$/mL to about 0.4 mg $C_{70}$/mL.

20. The method of claim 17, wherein the poor solvent is added to the mesitylene solution of $C_{70}$ to get a volume ratio of mesitylene solution to poor solvent of about 1:1 to about 1:6.

21. The method of claim 17, wherein the $C_{70}$ aggregate includes a cube-shaped crystalline $C_{70} \cdot 2$mesitylene aggregate.

22. The method of claim 21, wherein a part of the cube-shaped crystalline $C_{70} \cdot 2$mesitylene aggregate includes a dent on at least one side of the cube.

23. The method of claim 22, wherein the dent is located in the center of the cube side.

24. A method for preparing a cube-shaped crystalline $C_{70}$ non-solvent aggregate, comprising:
   (a) preparing a $C_{70}$ aggregate including a cube-shaped crystalline $C_{70} \cdot 2$mesitylene aggregate; and
   (b) treating the $C_{70}$ aggregate by thermal annealing under a reducing or inert atmosphere.

\* \* \* \* \*